United States Patent [19]

West

[11] 4,170,562

[45] Oct. 9, 1979

[54] PHENOL MODIFIED MANNICH REACTION PRODUCTS FROM OXIDIZED POLYMERS

[75] Inventor: C. Thomas West, Naperville, Ill.

[73] Assignee: Standard Oil Company, Chicago, Ill.

[21] Appl. No.: 877,875

[22] Filed: Feb. 15, 1978

[51] Int. Cl.$^2$ .................. C10M 1/32; C10M 3/26; C08F 210/100; C08C 19/22

[52] U.S. Cl. .................. 252/51.5 A; 252/51.5 R; 525/332; 525/374

[58] Field of Search .................. 252/51.5 R, 51.5 A; 526/19, 49

[56] References Cited

U.S. PATENT DOCUMENTS

| | | | |
|---|---|---|---|
| 3,864,268 | 2/1975 | Culbertson et al. | 526/19 |
| 3,868,329 | 2/1975 | Brown et al. | 252/51.5 A |
| 3,872,019 | 3/1975 | Culbertson et al. | 252/51.5 A |
| 4,011,380 | 3/1977 | West et al. | 252/51.5 R |
| 4,088,586 | 5/1978 | Wilgers et al. | 252/51.5 R |

*Primary Examiner*—Delbert E. Gantz
*Assistant Examiner*—Irving Vaughn
*Attorney, Agent, or Firm*—Mark J. DiPietro; Arthur G. Gilkes; William T. McClain

[57] ABSTRACT

The invention provides a process for the Mannich condensation reaction of oxidized olefinic polymers. The condensation reaction is carried out in the presence of about 0.01 to 25.0 weight percent of an oil soluble phenol based on the neat polymer. The phenols improve the processing and properties of the oxidized oil soluble Mannich reaction product.

7 Claims, No Drawings

PHENOL MODIFIED MANNICH REACTION PRODUCTS FROM OXIDIZED POLYMERS

Oxidized polymers have found a number of applications, one of which is as an intermediate for Mannich type derivatives useful in lubricating oil. These Mannich type additives display both dispersant and viscosity index improvement in lubricant oils. Lubricant deterioration in high speed engines causes the formation of lacquer, sludge, and carbon deposits on the interior surfaces of the engines. This foreign matter accelerates wear and reduces engine efficiency. The tendency for such injurious products to deposit on surfaces of engines is reduced by the incorporation in the lubricating oil of additives having dispersancy and/or detergency properties. The continuing search for and the necessity for having available ashless dispersants and detergent additives for motor oils is well known. Since the requirements of greater fuel economy and lower emissions from internal combustion engines has arisen, a greater demand exists for improved additives.

It is also well known that lubricating oils become thin at elevated temperatures while thickening at low temperatures. Generally certain polymeric additives improve lubricant oil temperature viscosity relationships. In the case of crankcase lubricants, the oil must not become so thick when cold that an engine is prevented from operation. At the same time, when the engine has fully heated up in operation, the oil must remain sufficiently viscous to maintain sufficient oil films for the lubrication of moving parts.

Various products have been developed for the purpose of improving both the detergent-dispersant and viscosity-temperature relationship functions in lubricant oils.

Culbertson, et al., U.S. Pat. No. 3,872,019 issued Mar. 18, 1975, discloses and claims bifunctional lubricant additives exhibiting dispersant and viscosity index improving properties obtained by the Mannich condensation of an oxidized long chain, high molecular weight amorphous copolymer of essentially ethylene and propylene having a number average molecular weight of at least about 10,000 and at least 140 pendent methyl groups per 1,000 chain carbon atoms with a formaldehyde yielding reactant and a primary or secondary amine or polyamine, said reactants being employed in the molar ratio of from about 1:2:2 to about 1:20:20, respectively.

West, et al., U.S. Pat. No. 4,011,380 issued Mar. 8, 1977, discloses and claims oxidation of polymers of olefinic monomers such as ethylene in the temperature range of from about $-40°$ F. to about $800°$ F. The oxidation is carried out in the presence of about 0.05 wt.% to about 1.0 wt.% based on the copolymer oil solution of an oil soluble substituted or unsubstituted benzene sulfonic acid or salt thereof. These sulfonic acids or salts thereof enhance the oxidation rate and improve the color of these polymers.

During the Mannich reaction of the oxidized copolymer in the West patent and in the production of the Culbertson Mannich additive two problems occur. Large amounts of solid resin impurity forms in reactions between formaldehyde reagents and amine reagents which fouls the reaction vessel, and lowers the quality of the Mannich additive. Harmful increases in the product viscosity can also occur during Mannich reaction.

The general object of the invention is to provide a process for production of the Mannich modified copolymer which prevents unwanted isoluble resin production during processing. Another object of the invention is to produce the Mannich modified polymer while preventing a large increase in product viscosity during processing. A further object of the invention is to produce an improved Mannich modified polymer which retains excellent viscosity-index improving properties and detergent-dispersant properties which are produced with low viscosity change and low insoluble resin formation.

I have discovered that phenolic compounds are effective in preventing resin formation and large viscosity increases during the Mannich reaction.

Briefly, the modified Mannich reaction products of this invention can be produced by reacting oxidized polymer, the amine, and formaldehyde yielding reagent in the presence of an oil soluble phenol at a temperature of about $250°-350°$ F. and recovering the resulting reaction product. The Mannich condensation reaction can be conducted using a non-reactive solvent such as aromatic or aliphatic hydrocarbons, or lubricant oils. Further details of the Mannich condensation reaction are found in Culbertson, et al., U.S. Pat. No. 3,872,019, which is expressly incorporated by reference herein.

The Mannich reaction can be catalyzed by addition of an alkylbenzene sulfonic acid. The oxidized high molecular weight polymer is aminated in the presence of about 0.01 to 40.0 weight percent of an oil soluble sulfonic acid. To avoid darkening the reaction mixture the sulfonic acid is added at the same time as the amine or after the amine. The Mannich condensation reaction is catalyzed by the addition of an oil soluble sulfonic acid. The sulfonic acid can be added in amounts of about 0.01 to 40.0 percent by weight based on the copolymer. This catalyst is disclosed in West Case No. 13404, Ser. No. 877,874 filed on Feb. 15, 1978 which is U.S. Pat. No. 4,131,553 and is incorporated herein by reference.

The term "olefinic polymer," as used herein and in the claims refers to amorphous polymers derived from olefinically unsaturated hydrocarbon monomers, preferably copolymers of ethylene and other olefin monomers. Such olefin monomers include olefins of the general formula $R-CH=CH_2$, in which R is hydrogen, an aliphatic or cycloaliphatic radical of from 1 to about 20 carbon atoms, for example, propene, isobutylene, 1-butene, 1-hexene, 4-methyl-1-pentene, and 1-decene. Other olefin monomers having a plurality of double bonds may be used, in particular di-olefins containing from about 4 to about 25 carbon atoms, e.g., 1,3-butadiene, 1,4-hexadiene, 1,4-pentadiene, 2-methyl-1,5-hexadiene, 1,7-octadiene, 5-methylene-2-norbornene, norbornadiene, etc.

Suitable ethylene, propylene copolymers contain about 20 to about 65, preferably from about 35 to about 45 mole percent propylene having a number average molecular weight of at least 20,000, i.e., from about 20,000 to about 200,000 or more, and preferably from about 20,000 to about 70,000 and contain at least 100 pendant methyl groups per 1,000 chain carbon atoms.

A particularly suitable ethylene-propylene copolymer is one having the following characteristics:

| | |
|---|---|
| Number Average Molecular Weight | 25,000–35,000 |
| Percent (Molar) Propylene Monomer | 38–42 |

| | |
|---|---|
| Pendant Methyl Groups per 1,000 Chain Carbon Atoms | 160–170 |
| Inherent Viscosity | 1.7–2.0[A] |
| Gardner Viscosity | U-V[B] |
| Mooney Viscosity | 20–35[C] |

[A] 0.1 gram copolymer in 100 cc decalin at 135° C.
[B] 8.0% copolymer in toluene at 25° C.
[C] ASTM D-1646

Methods of preparation of the copolymers are well known. Such methods are described in many United States patents, e.g., U.S. Pat. Nos. 2,700,633; 2,725,231; 2,792,288; 2,933,480; 3,000,866; 3,063,973; 3,093,621, and others. The copolymer used in this invention is commonly oxidized. The oxidation can be accomplished by contacting the copolymer under suitable conditions of temperature and at atmospheric pressure or elevated pressures with an oxidizing agent such as air or free oxygen or any oxygen containing material capable of releasing oxygen under these conditions. If desired, the oxidation can be conducted in the presence of known oxidation catalysts such as platinum or platinum group metals and compounds containing metals such as copper, iron, cobalt, cadmium, manganese, vanadium, etc. The oxidation can be carried out by methods described in U.S. Pat. Nos. 2,982,728; 3,316,177; 3,153,025; 3,865,499; and 3,544,520.

Generally, the oxidation can be carried out over a wide temperature range, depending upon the oxidizing agent used; for example, with an active oxidizing agent, e.g., $SO_3$, temperatures in the range of $-40°$ F. to 400° F. have been used, while with less active oxidizing agents, e.g., air, temperatures in the range of 100°–800° F. have been used. The copolymers are generally dissolved in oil prior to the oxidation. Further, depending upon the rate desired, the oxidation can be conducted at sub-atmospheric, atmospheric or super-atmospheric pressures, and in the presence or absence of oxidation catalysts. The conditions of temperature, pressure, oxygen content of the oxidizing agent, the rate of introducing the oxidizing agent, the catalyst employed, if any, etc., are correlated and controlled, by those skilled in the art, so as to obtain the desired optimum results.

The following illustrates one method of oxidizing the copolymer: to a copolymer of ethylene and propylene (1 part), having a number average molecular weight of about 28,000, was added a solvent-extracted SAE 5W mineral oil (9 parts) in an open reaction vessel, and the mixture was slowly stirred and heated at a temperature of 360° F., under an inert gas atmosphere, until the solution of the rubber-like polymer in the solvent was affected. Maintaining the 360° F. temperature, the mixture was rapidly agitated in an atmosphere composed of 50 percent air and 50 percent nitrogen, to promote the oxidation of the copolymer. A 50:50 air-nitrogen ratio was used to preclude the possibility of an explosive mixture being formed. Reaction in the described manner was continued for 2.5–4.0 hours. About 5–50 oxygen atoms per molecule of the copolymer were introduced under such oxidation conditions.

In the Mannich reaction the formaldehyde can be provided by any common formaldehyde generating reagent. Examples of formaldehyde generating reagents are formalin, paraformaldehyde, other linear and cyclic formaldehyde polymers, gaseous formaldehyde and the like.

The amine reactant used in the preparation of the products of the present invention are primary and secondary aliphatic amines and diamines of the general formula $NH_2(CH_2)_yNH_2$, wherein y is an integer of 3 to about 10 and amines and diamines containing up to about 10 carbon atoms in the alkyl group, the polyalkylene polyamines of the general formula:

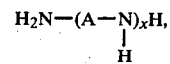

wherein A is a divalent alkylene radical of about 2 to about 6 carbon atoms, and x is an integer from 1 to about 10. Illustrative of such suitable amines are: methylamine, dibutylamine, cyclohexylamine, propylamine, decylamine, ethylenediamine, trimethylenediamine, tetramethylenediamine, hexamethylenediamine, diethylenetriamine, triethylenetetraamine, tetraethylenepentamine, tripropylenetetramine, tetrapropylenepentamine, and other polyalkylene polyamines in which the alkylene group contains up to about 10 carbon atoms.

The Mannich condensation reaction of the oxidized copolymers carried out in the presence of about 0.01 wt.% to about 25 wt.%, preferably from about 0.10 wt.% to about 2 wt.% based on the copolymer of substituted or unsubstituted phenol. As can be seen below, a wide variety of such phenols can be used to prevent unwanted viscosity increase or unwanted resin formation during processing.

Some of the above compounds have the general formula:

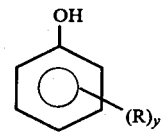

where R is alkyl; or hydroxy, chloro or bromo substituted hydrocarbyl; y is an integer from 1 to 5. In some cases the R group can be made by polymerizing $C_2$–$C_6$ olefins to a molecular weight in the range of about 80 to about 100,000, preferably about 80 to 1,000 and then attaching said group to a benzene ring by well known alkylation techniques. R can be a hydrocarbyl group such as methyl ethyl, propyl, isopropyl, butyl, isobutyl, t-butyl, amyl, isoamyl, t-amyl, isomers of hexyl, heptyl, nonyl, decyl, undecyl, dodecyl and other $C_{13}$–$C_{20}$ isomers and the like, having a molecular weight from about 15 to 1000.

R can be any hydrocarbon or substituted hydrocarbon which results in an oil soluble phenol or salt thereof. R can be an intermediate molecular weight hydrocarbyl such as a $C_{15}$–$C_{100}$ of polybutene or polypropylene polymer, a high molecular weight hydrocarbyl such as polyolefin having a number average molecular weight about 15 to 100,000, preferably about 200 to 10,000 and others. R can be substituted with groups such as chlorine, bromine, hydroxy, or other groups.

The following illustrates one method of conducting the Mannich condensation reaction with the oxidized polymer with the phenol process aid. 100 parts of the oxidized copolymer and 0.75 parts nonyl phenol in 1000 parts of SAE 5W mineral oil diluent was heated to 360° F. under a nitrogen blanket. 0.2 parts of solid paraformaldehyde and 0.75 parts of molten hexamethylene diamine are added simultaneously to the stirred reaction mixture at a temperature of 360° F. under a nitrogen blanket. The reaction was continued for 2 hours liberating water until complete. The mixture was stripped with nitrogen at 360° F. to remove water and other volatile byproducts. After filtration the mixture was clear.

The chemical composition of the reaction product of the oxidized polymer, the amine, the formaldehyde yielding reagent and a phenol cannot be characterized with precise chemical formulas. While it is believed that the oxidation of the polymer produces predominately carbonyl groups, it is known that a minor amount of aldehyde, acid and perhaps ester can also be present in the oxidized polymer chain. In view of the complex nature of the oxidized reaction product, the precise composition, reaction sites, and final structure of such product cannot be defined by its chemical structure but rather must be defined purely through method of preparation. The Mannich condensation reaction of an oxidized copolymer includes many various side reactions. For example, crosslinking, cyclization, polymerization, and Shiff base formation can occur. Chemical reactants which are added at different steps in the process, beginning with the polymerization of the copolymer and ending with the Mannich condensation reaction, can produce different useful compounds when added to the reaction at different steps. The reaction sites of the various chemical additives vary with the step in which the various chemical reactants are added. Therefore, a reactant added during the polymerization will produce unique effects on the chemical and physical properties of the polymer. Reactants which are added during the oxidation of the polymer and during the Mannich condensation reaction will produce effects which are also unique.

The described reaction products of the present invention are effective dispersant and viscosity index improving additives in lubricant compositions when used in amounts from about 0.1 to about 10 percent based on the lubricant. Suitable lubricating base oils are mineral oils, petroleum oils, synthetic lubricating oils such as those obtained by the polymerization of hydrocarbons, and other well known synthetic lubricating oils, and lubricating oils of animal or vegetable origin. Concentrates of a suitable oil base containing more than 10 percent, that is of about 10 to about 75 percent or more of the additive of the present invention, alone or in combination with other well known additives, can be used for blending with the lubricant oils in proportions desired for particular conditions or used to give finished products containing from about 0.1 to about 10% of bifunctional additives of this invention.

EXAMPLE I

A. Oxidation of the Copolymer 70 grams of an ethylene-propylene copolymer, about 40 mole percent propylene having a molecular weight of about 30,000, in 1000 gms of 100 N oil was placed in a flask fitted with a stirrer and means to blow a 50/50 mixture of air and nitrogen through the contents. 1.5 grams of an overbased magnesium polypropyl benzene sulfonate, molecular weight about 900, oxidation catalyst was added and the flask was heated to 395° F. Nitrogen and air were bubbled through the mixture until oxidation and polymer degradation reduced the viscosity of the mixture to about 2100 Saybolt Universal Seconds at 210° F. The reaction was complete in 2½ hours, and then cooled to room temperature.

B. Mannich Reaction

To 200 g of a 7.0 wt. % oxidized ethylene-propylene copolymer in oil solution at 360° F., was added 1.27 g of hexamethylene diamine (0.011 moles), 2.0 g of 45.0 wt. % polypropyl benzene sulfonic acid in oil solution (molecular weight about 665) (0.0014 moles), 1.64 of 37.0 wt. % aqueous formaldehyde (0.02 moles) and 1.08 g of phenol (0.013 moles). The reaction was allowed to continue for 1 hour and the product was stripped of volatiles with nitrogen at 360° F. for 1 hour.

EXAMPLE II

Example I was repeated with 4-t-butyl phenol in a molar ratio of 1:1 with the hexamethylene diamine (HMDA).

EXAMPLE III

Example I was repeated with 2,6-di-t-butyl phenol in a molar ratio of 1:1 with the hexamethylene diamine (HMDA).

EXAMPLE IV

Example I was repeated with 2,4-di-t-butyl phenol in a molar ratio of 1:1 with the hexamethylene diamine (HMDA).

EXAMPLE V

Example I was repeated with p-methyl phenol in a molar ratio of 1:1 with HMDA.

EXAMPLE VI

To 200 gm of a 10 wt.% solution of an oxidized polymer as produced in part A at 360° F. were added 1.80 gm hexamethylene diamine (0.016 moles), 2.52 gm of 37 wt.% aqueous formaldehyde (0.031 moles), 2.78 gm of 45 wt.% polypropylbenzene sulfonic acid in oil solution, molecular weight 665 (0.0019 moles) and 5.12 gm nonyl phenol (0.023 moles). The solution was allowed to react at 360° F. for 1 hour and then was stripped at 360° F. with nitrogen for 1 hour.

EXAMPLE VII

Example VI was repeated with nonyl phenol at a molar ratio of 1:1 with HMDA.

EXAMPLE VIII

Example VI was repeated with p-dodecyl phenol in a molar ratio of 1:1 with HMDA.

EXAMPLE IX

Example VI was repeated with p-dodecyl phenol in a molar ratio of 1.5:1 with HMDA.

EXAMPLE X

Example VI was repeated with polybutyl phenol having a molecular weight of about 1800 in a mole ratio of 1.5:1 HMDA.

EXAMPLE XI

Example VI was repeated with no phenol addition.

Table I shows various preparations made according to the examples.

TABLE I

EFFECT OF PHENOL ON VISCOSITY AND ADDITIVE PROPERTIES

| Example | Phenol | Viscosity | Spot Dispersancy Test* | Hot Tube Test Air | Hot Tube Test NOx |
|---|---|---|---|---|---|
| VI | Nonyl | +125 | 70** | — | — |
| II | 4-t-Butyl | +110 | 86 | 5 | 1 |
| III | 2,6-di-t-butyl | +244 | 88 | 5 | 3 |
| IV | 2,4-di-t-butyl | +80 | 80 | 5 | 2 |
| V | p-CH3 | +194 | 90 | 6 | 1 |
| VII | Nonyl | +215 | 75** | — | — |
| VIII | Dodecyl | +235 | 70** | 5.0 | 1.5 |
| IX | Dodecyl | +180 | 59** | — | — |
| X | Polybutyl | −193 | 72*** | — | — |
| XI | Omitted | +1367 | 74** | 4.0 | 1.5 |
| I | Phenol | +550 | 86 | 4 | 2 |

*at 12% in lubricant
**at 6% lubricant
***molecular weight is about 1400.

The Spot Dispersancy Test gives a measure of the oil's ability to disperse sludge and varnish. In the Spot Dispersancy Test, a quantity of engine sludge is incubated for 24 hours at 210° F. with the additive composition and 3-10 drops of the oil mixture are dropped onto a standard white blotter paper. After 24 hours, the diameters of the sludge spot and the oil spot are measured. Dispersancy is the ability of an oil to keep sludge in suspension. Thus, dispersancy will be reflected by the difference in diameters of the sludge and oil spots. A rating (SDT Rating) is given by the diameter of the sludge spot divided by the diameter of the oil spot, and multiplied by 100. A high numerical rating indicates good dispersancy.

The hot tube test is a determination of the oxidation and varnish resistance properties of an oil package. A measured quantity of oil is metered into a 2 mm heated glass tube through which hot air and/or nitrogen dioxide is blown through the tube. The oil is consumed in the test and the deposits in the tube are measured. The tubes are rated from zero through ten. Zero being a heavy black opaque deposit, and 10, perfectly clean.

Table I shows results of testing of the various Mannich Condensation products of the oxidized polymer in which various phenols are used. The viscosity increases during amination of the products are less than the viscosity increase of a product in which no phenol is used.

Table II shows the effect of phenols on reducing resin formation. These preparations are prepared as in Example I.

TABLE II

PHENOL AS RESIN REDUCER PROCEDURE LIKE EXAMPLE XI EXCEPT THE MOLAR RATIOS ARE VARIED

| Mol HCHO per Mol HMDA | Mol Phenol per Mol HMDA | Polypropyl Benzene Sulfonic Acid Per Mol HMDA | Product Yield (%) | % Resin |
|---|---|---|---|---|
| 2.24 | 0 | 0.1 | — | 0.303 |
| 2.24 | 0 | 0.1 | — | 0.218 |
| 1.09 | 0 | 0 | 99.0 | 0.257 |
| 1.13 | 0 | 0 | 98.6 | 0.178 |
| 2.03 | 0.50 | 0.1 | 98.3 | 0.230 |
| 1.85 | 1.05 | 0.1 | — | 0.107 |
| 1.86 | 1.71 | 0.1 | 98.0 | 0.053 |

Resin is reduced by a factor of six using a phenol process aid.

I claim:

1. A process of producing Mannich compound which comprises reacting a high molecular weight oxidized amorphous addition polymer of essentially olefinically unsaturated monomers, a formaldehyde yielding reactant, at least one amine selected from the group consisting of alkyl primary or secondary aliphatic monoamines having from about 2 to about 12 carbon atoms and a polyalkylene polyamine of the general formula: $NH_2-[(CH_2)_zNH]-_xH$ wherein z is an integer from about 2 to about 6 and x is an integer from about 1 to about 10 and a phenolic compound, wherein the phenol compound is present at about 0.01 to 25.0 weight percent based on the polymer.

2. The process of claim 1 wherein the phenolic compound has a formula represented by:

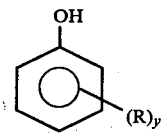

wherein R is an alkyl or alkenyl radical having a molecular weight from about 15 to 100,000 and y is a number from 1-5.

3. The process of claim 2 wherein R is an alkyl group having a molecular weight from about 80 to about 1,000.

4. The process of claim 2 wherein the phenolic is a polybutyl phenol of a number average molecular weight from about 200 to 10,000.

5. The process of claim 2 wherein R is an alkyl radical, derived from polymerized $C_2-C_6$ olefins, having a molecular weight from about 80 to about 100,000.

6. A lubricant oil containing about 0.1 to 10.0 weight percent based on the oil of the product of the process of claim 1.

7. The process of claim 1 wherein the oxidized high molecular weight polymer is aminated in the presences of about 0.01 to 40.0 weight percent of an oil soluble sulfonic acid.

* * * * *